United States Patent
VanGilder et al.

(10) Patent No.: US 11,514,215 B2
(45) Date of Patent: Nov. 29, 2022

(54) SYSTEMS AND METHODS FOR CONSTRUCTING A COMPACT WALL MODEL

(71) Applicant: SCHNEIDER ELECTRIC IT CORPORATION, Foxboro, MA (US)

(72) Inventors: James William VanGilder, Pepperell, MA (US); Zachary M. Pardey, Waltham, MA (US); Christopher M. Healey, Tewksbury, MA (US)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 564 days.

(21) Appl. No.: 16/469,832

(22) PCT Filed: Dec. 15, 2017

(86) PCT No.: PCT/US2017/066601
§ 371 (c)(1),
(2) Date: Jun. 14, 2019

(87) PCT Pub. No.: WO2018/112307
PCT Pub. Date: Jun. 21, 2018

(65) Prior Publication Data
US 2020/0257838 A1 Aug. 13, 2020

Related U.S. Application Data

(60) Provisional application No. 62/435,324, filed on Dec. 16, 2016.

(51) Int. Cl.
*G06F 30/28* (2020.01)
*G06F 119/08* (2020.01)
*G06F 111/10* (2020.01)

(52) U.S. Cl.
CPC .......... *G06F 30/28* (2020.01); *G06F 2111/10* (2020.01); *G06F 2119/08* (2020.01)

(58) Field of Classification Search
CPC .. G06F 30/28; G06F 2111/10; G06F 2119/08; G06F 30/20; G06F 30/25; G06F 30/27; G06F 2119/22
See application file for complete search history.

(56) References Cited

U.S. PATENT DOCUMENTS

| | | | |
|---|---|---|---|
| 2012/0330626 A1* | 12/2012 | An | G01K 17/20 703/2 |
| 2014/0000836 A1* | 1/2014 | Xu | F24F 11/62 165/11.1 |
| 2015/0100267 A1 | 4/2015 | Mischke | |

OTHER PUBLICATIONS

Sami Al-Sanea, "Evaluation of Heat Transfer Characteristics of Building Wall Elements," Elsevier B.V. on behalf of King Saud University, pp. 285-312 (Year: 2000).*
(Continued)

*Primary Examiner* — Steven W Crabb
(74) *Attorney, Agent, or Firm* — Lando & Anastasi, LLP

(57) ABSTRACT

Systems and methods for a compact wall model are provided. According to one aspect, embodiments herein provide a method that comprises receiving input data related to an enclosure, the input data including solar intensity data on an exterior of a wall of the enclosure, generating, by a processor, a thermal model of a wall of the enclosure based at least in part on the input data, the wall modeled as having a plurality of layers and the thermal model including a plurality of nodes such that each layer of the plurality of layers is associated with at least one node of the plurality of nodes and each node of the plurality of nodes is thermally coupled to an adjacent node by a thermal resistance, solving, by the processor, an energy balance equation for the at least one node to determine a predicted temperature for the at least one node, and output the predicted temperature to a display device.

27 Claims, 7 Drawing Sheets

(56) References Cited

OTHER PUBLICATIONS

M.M. Gouda et al: "Building thermal model reduction using non-linear constrained optimization", Building and Environment, vol. 37, No. 12, Jan. 13, 2002 (Jan. 13, 2002), pp. 1255-1265, XP055454851, GB ISSN: 0360-1323, DOI: 10.1016/S0360-1323(01)00121-4.
Notification of Transmittal of the International Search Report and the Written Opinion of the International Searching Authority from corresponding PCT/US2017/066601 dated Mar. 9, 2018.
Zhang Rui et al. "Coupled EnergyPlus and computational fluid dynamics simulation for natural ventilation", Building and Environment, vol. 68, Jun. 22, 2013 (Jun. 22, 2013), pp. 100-113, XP028694812, ISSN: 5360-1323, DOI: 10.1016/J.BUILDENV.2013.04.002.

* cited by examiner

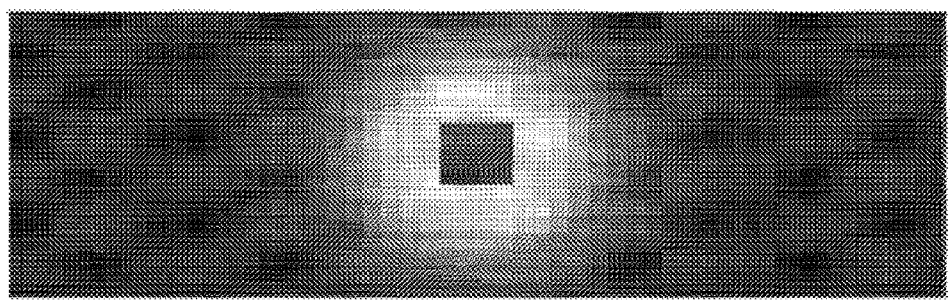
a) Compact Wall Model
FIG. 5A
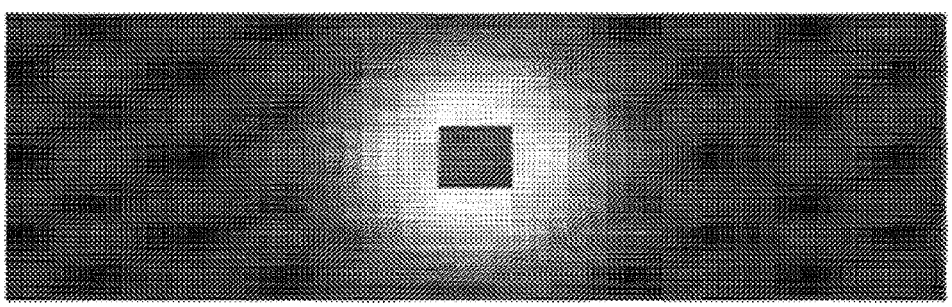
b) Benchmark
FIG. 5B
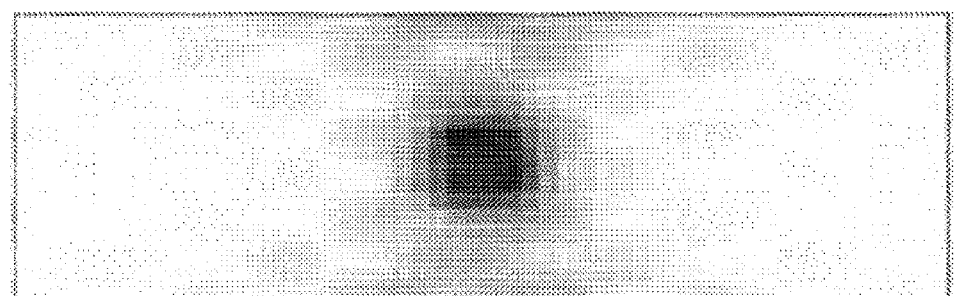
c) Temperature Differences
FIG. 5C
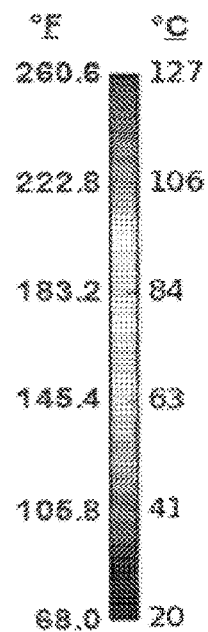
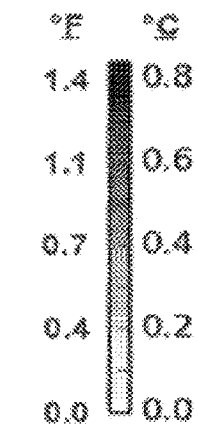

SYSTEMS AND METHODS FOR CONSTRUCTING A COMPACT WALL MODEL

RELATED APPLICATIONS

This application is a U.S. National Stage Application under 35 U.S.C. § 371 of International Application No. PCT/US2017/066601, filed Dec. 15, 2017, titled SYSTEMS AND METHODS FOR CONSTRUCTING A COMPACT WALL MODEL, which claims the benefit under 35 U.S.C. § 119(e) of U.S. Provisional Application No. 62/435,324, filed Dec. 16, 2016, titled SYSTEMS AND METHODS OF COMPACT WALL MODELS FOR CFD SIMULATIONS, both of which are hereby incorporated by reference in their entirety for all purposes.

BACKGROUND

Computational Fluid Dynamics (CFD) use mathematical methods to solve problems that include fluid flow, such as air flow distribution within a data center. Although CFD modeling is an effective way to optimize data center airflow configurations, CFD analysis methods have a number of disadvantages. For example, a CFD approach typically involves calculations that are time-consuming and may include many assumptions which are intrinsically built into the model, which can lead to inaccurate results.

SUMMARY

Aspects of the present invention are directed to a method that comprises receiving input data related to an enclosure, the input data including solar intensity data on an exterior of a wall of the enclosure, generating, by a processor, a thermal model of a wall of the enclosure based at least in part on the input data, the wall modeled as having a plurality of layers and the thermal model including a plurality of nodes such that each layer of the plurality of layers is associated with at least one node of the plurality of nodes and each node of the plurality of nodes is thermally coupled to an adjacent node by a thermal resistance, solving, by the processor, an energy balance equation for the at least one node to determine a predicted temperature for the at least one node, and output the predicted temperature to a display device.

According to one embodiment, generating the thermal model includes identifying the plurality of layers of the wall as an inner surface layer thermally coupled to an interior volume of the enclosure, an outer surface layer including the exterior of the wall and thermally coupled to an ambient environment, and a center layer thermally coupled to the inner surface layer and the outer surface layer.

According to one embodiment, the thermal resistance is configured to account for thermal conductivity such that a first node associated with the center layer is conductively coupled to a node of the inner surface layer, a node of the outer surface layer, and to a second, third, fourth, and fifth adjacent node associated with the center layer.

According to one embodiment, the method further comprises applying a weighting parameter to at least one thermal resistance. In one embodiment, the weighting parameter is applied to a thermal resistance between the first node and the node of the inner surface layer and to a thermal resistance between the first node and the node of the outer surface layer.

According to one embodiment, solving the energy balance equation includes solving the energy balance equation for the at least one node at a plurality of time steps to determine a predicted temperature change at the at least one node over time.

According to one embodiment, solving the energy balance equation includes compensating for solar load based on the solar intensity data.

According to one embodiment, generating the thermal model includes defining the wall as a physical domain represented by the plurality of nodes in a three-dimensional space and mapping a portion of the plurality of nodes in the three-dimensional space onto a two-dimensional plane. In one embodiment, the enclosure includes two adjacent exterior walls that lie on planes that intersect along a straight line defined by an edge of the two adjacent exterior walls, and the two-dimensional plane includes the edge.

According to one embodiment, the method further comprises incorporating the thermal model with a CFD model of an interior volume of the enclosure. In one embodiment, the CFD model of the interior volume is represented by a grid that forms a plurality of cells, the plurality of cells including a plurality of interior cells that are adjacent to an inner layer of the plurality of layers. In one embodiment, the method further comprises implementing a design of the interior volume based on the CFD model.

According to one embodiment, the method further comprises using, by the processor, the predicted temperature to adjust an operating parameter of equipment in the interior volume.

According to another aspect, the invention is directed to a system that comprises a storage device, a display device, a controller coupled to the storage device and the display device and configured to: receive input data from the storage device related to an enclosure, the input data including solar intensity data on an exterior of a wall of the enclosure, generate a thermal model of a wall of the enclosure based at least in part on the input data, the wall modeled as having a plurality of layers and the thermal model including a plurality of nodes such that each layer of the plurality of layers is associated with at least one node of the plurality of nodes and each node of the plurality of nodes is thermally coupled to an adjacent node by a thermal resistance, solve an energy balance equation for the at least one node to determine a predicted temperature for the at least one node, and output the predicted temperature to the display device.

According to one embodiment, the controller is further configured to apply a weighting parameter to at least one thermal resistance. According to another embodiment, the controller is configured to apply the weighting parameter to a thermal resistance between the first node and the node of the inner surface layer and to a thermal resistance between the first node and the node of the outer surface layer.

According to one embodiment, solving the energy balance equation includes solving the energy balance equation for the at least one node at a plurality of time steps to determine a predicted temperature change at the at least one node over time.

According to one embodiment, the system further comprises at least one sensor coupled to the storage device and configured to measure the solar intensity data.

According to one embodiment, solving the energy balance equation includes compensating for solar load based on the solar intensity data.

According to one embodiment, the controller is configured to incorporate the thermal model with a CFD model of an interior volume of the enclosure.

According to one embodiment, the controller is further configured to adjust an operating parameter of equipment in the enclosure using the predicted temperature.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments," "certain embodiments," or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 5A is a schematic of temperature values of the heated block and enclosure of FIG. 4 determined using a thermal model in accordance with one or more aspects of the invention;

FIG. 5B is a schematic of temperature values of the heated block and enclosure of FIG. 4 determined using a numerical benchmark solution;

FIG. 5C is a schematic of the temperature differences between the temperature values obtained in FIG. 5A and the temperature values obtained in FIG. 5B.

DETAILED DESCRIPTION

Figure 1A:
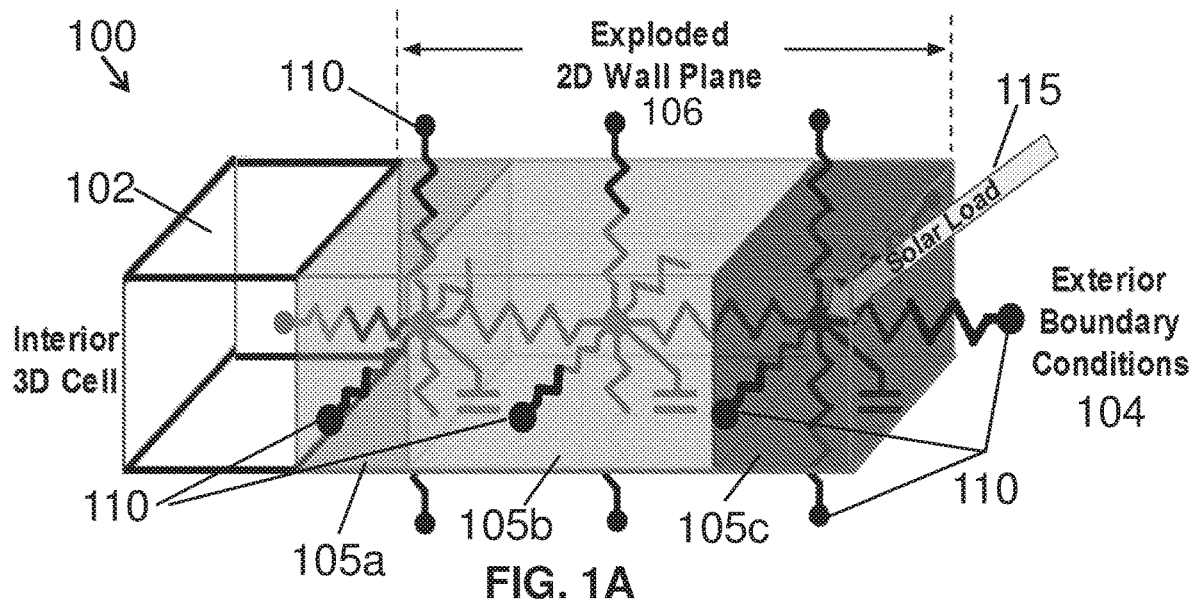
FIG. 1A is a schematic diagram showing an exploded isometric view of an example of a thermal model in accordance with one or more aspects of the invention.

In data centers, temperature and airflow are invisible and non-linear, necessitating the need for computational systems to visualize thermal performance. When properly applied, CFD modeling is one example of a computational system that is capable of providing a comprehensive assessment of airflow, temperature, or other characteristics of a data center environment. CFD analysis can be used by designers or data center operators to perform hypothetical analysis for purposes of optimizing and controlling one or more components of the data center, such as cooling equipment and IT equipment.

In some applications, it may be desired to model both internal and external walls of a building environment or other type of enclosure in CFD simulations, especially at the room level. Actual walls are typically composed of multiple (thin) layers and may be exposed to solar irradiance. Modeling the wall construction explicitly can be tedious (e.g., due to complexities at wall intersections) and also problematic, as the computational grid required for a CFD analysis in the wall may be much finer than that of the adjacent fluid region. This is an issue particularly in preliminary design applications where a coarse grid may be more efficient. The disparity in grid length scale can dramatically increase solution times and negatively impact robustness, resulting in the need for a large overall cell count to achieve low-aspect-ratio cells.

To decrease the time and effort required to construct and solve CFD simulations, it is often useful to idealize physically-complex objects using compact mathematical "black box" models. Such models are designed to be "tuned" so that their behaviors match those of their explicitly-modeled counterparts. In addition, it is also useful to implement mathematical models that predict transient phenomena of air-moving devices, and thus temperature, within the data center.

Conventional models for data centers usually ignore or otherwise neglect heat transfer through the building's walls, at least for steady-state analyses, for a number of reasons. For instance, the building may not have external walls, or heat loss through the walls is a very small fraction of the total data center heat load because the wall-surface to room-volume ratio is low. However, for small structures, such as enclosures configured as shipping containers or modular systems, heat transfer to and from the exterior environment becomes more important. In such types of enclosures, the wall-surface to room-volume ratio is high, and such systems are often deployed in harsh (e.g., temperature, wind, solar load) environments, such as deserts or oil platforms, that cause large temperature differences across the walls, and intense solar loads. Furthermore, containerized systems are more likely to operate under transient thermal conditions and house equipment with time-dependent thermal loads. For example, the solar radiation thermal load may change due to the changing position of the sun throughout the day.

Conventional methods for predicting temperatures inside modular enclosures involve using either a lumped thermal analysis or a CFD simulation with a fine grid inside the walls. Both of these approaches present drawbacks. The lumped analysis predicts only a single average temperature for the walls and a single temperature for the air inside the enclosure, and thus fails to predict any localized hot or cold spots that may breach the thermal requirements of the given application. Temperatures within a modular container can span a range of 20° C. or more, and thus the lumped methodology can lead to significant inaccuracies in predicted temperatures inside the enclosure. In contrast, a detailed CFD analysis may include analysis capable of detecting and alerting the designer or operator of any hot or cold spots, but requires substantial knowledge of and access to commercial CFD software. Further, even for a skilled CFD modeler using commercial tools, creating multi-layered wall models with all of the various wall intersections is, at best, tedious. As explained further below, the wall grid cells used in the CFD model may be much finer than necessary for obtaining accurate simulation results in the fluid, and therefore add unnecessary computational overhead and increased computing times without any added benefits.

Other methods for predicting transient temperatures inside an enclosure also have disadvantages. For instance, some approaches treat wall heat transfer in only one dimension (normal to the wall), which fails to accurately capture the spreading of heat in the in-plane directions. In contrast, other approaches represent the wall as having a physical thickness and numerous fine grid cells within its cross-section, which is too computationally intensive to be of practical use for many applications. For instance, preliminary design applications, which can extract useful information from coarse room-air grid simulations, may not require the fine wall-grid implemented in a detailed wall simulation. Therefore, to avoid high-aspect ratio grid cells and large disparities in the sizes of adjacent cells, a large number of grid cells, a variable grid, or even an unstructured grid may be necessary. All of these approaches are inefficient from a modeling perspective due to the large computational requirements.

Aspects of this disclosure relate to a thermal model (also referred to herein as a "compact model," "compact wall model," or "thermal wall model") that may be applied to an external wall of an enclosure and may be used to account for solar heat flux and three-dimensional heat transfer. Wall heat transfer and thermal mass are included in the disclosed thermal model, which is useful for certain applications. For instance, these effects are significant in enclosures that include modular and containerized applications, which are increasingly deployed as modular data centers, electrical substations, grid-scale energy storage systems, wind and solar energy support systems, and hydroponic farming systems, among others. The thermal model may be compact in that it can account for both steady-state and transient conditions.

The thermal model idealizes the wall as a geometrically two-dimensional plane and is capable of capturing three-dimensional heat transfer, solar load, and thermal mass effects in the geometrically two-dimensional representation. The thermal model is capable of being implemented without the use of any computational grid cells within the wall, and can be incorporated or otherwise integrated with CFD or CFD-based analyses, including proprietary and open-source CFD and CFD-based tools, or in other commercial tools using, for example, user-defined functions or combinations of two-dimensional shell-conduction objects. The thermal wall model can be used in any CFD or CFD-based simulation of the interior of a fluid-volume region that borders another fluid-volume region or the outdoors. The disclosed compact wall model offers an improvement over the wall models discussed above, for example, by simplifying the CFD model process and improving the speed and robustness of the numerical solution. In addition, large cell-sized grids may be used in combination with the model, which is ideal for preliminary design applications. The complexity of the model disclosed herein may also be invisible to the user, allowing for ease of use. As discussed in further detail below, the thermal wall model's temperature predictions compare favorably to detailed benchmark solutions that include transient solar load and heat conduction in the lateral directions of the wall.

Compact Thermal Wall Model

Figure 1B:
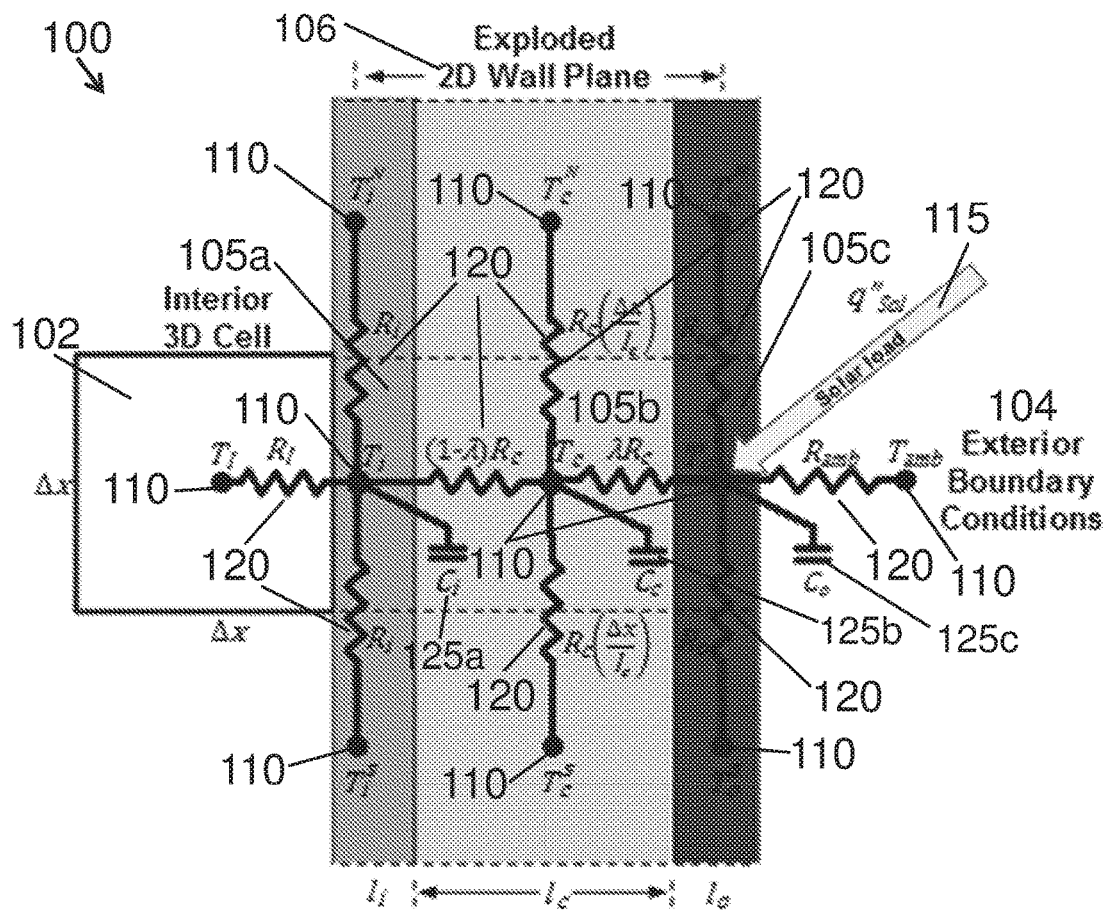
FIG. 1B is a schematic diagram showing an exploded 2D view of the example of the thermal model of FIG. 1A.

FIGS. 1A and 1B schematically show an exploded isometric view and an exploded two-dimensional view, respectively, of an example of a thermal model, shown generally at 100, according to various embodiments of the present disclosure. The thermal model 100 idealizes the wall as a two-dimensional (2D) plane 106 that divides the wall into a plurality of layers. The example shown in FIGS. 1A and 1B models or otherwise identifies the plurality of layers of the wall as three layers: an inner layer 105$a$ (also referred to herein as an inner surface layer), a center layer 105$b$ (which may also be referred to as an interior layer), and an outer layer 105$c$ (also referred to herein as an outer surface layer). It is to be appreciated that other embodiments may model the wall as having fewer than three layers, or having more than three layers.

The thermal model 100 is compatible with and may be integrated with a CFD or CFD-based model for the data center that applies a computational grid to the interior volume of the enclosure housing the data center. According to one embodiment, the CFD or CFD-based model applied to the interior of the data center enclosure implements a uniform three-dimensional grid for the air and solid objects inside the enclosure, but it is to be appreciated that other embodiments may include CFD models implementing the use of non-uniform or unstructured three-dimensional grids. In some embodiments, the uniform grid may include cubic cells, but other embodiments may include rectangular, triangular, or other suitable cell geometries.

Both the CFD or CFD-based model and the thermal model analysis may include receiving input data that includes information regarding physical and/or logical characteristics of the data center, such as equipment information (e.g., IT equipment, cabinets, network equipment, cooling devices), equipment layouts, including the layout of equipment racks and cooling equipment, and data center architecture (e.g., cooling architecture), building or enclosure information (e.g., materials and their physical properties, physical dimensions, tile perforation details, locations of windows, doors, vents, etc., and locations of airflow obstructions such as blanking panels). In some instances, the input data also includes measurement data (e.g., from temperature, humidity and/or airflow sensors in the data center, such as rack/cabinet inlet and outlet temperatures and cooling supply air temperatures and airflows, and power sensors (e.g., power consumed by equipment), as well as measurement data from the external (ambient) environment, such as temperature, humidity, and solar intensity data. The input data may be used in the model(s), the results of which may then be used to control equipment and/or provide information to a user.

For the CFD model, a structured multi-block 3D mesh or grid may then be generated for the interior of the data center based at least in part on the input data, and a CFD solver may be applied to each 3D volume (e.g., "block") of the grid. The 3D volumes exchange information with each other at the block interface boundaries. In certain instances, numerical computing of each node in each 3D volume is determined based on fluid and grid-related properties, non-limiting examples of which include flow physics, physical properties, mesh connectivity, etc. For instance, CFD is based on the fundamental laws of mechanics to a fluid, and thus includes the governing equations that implement the conservation of mass, momentum, and energy, to form a set of coupled, non-linear partial differential equations. The grid of the CFD model establishes a discrete domain, where each flow variable is defined only at the grid points and relevant flow variables are directly solved for at the grid points, with values at other locations determined by interpolating the values at the grid points.

According to one or more aspects, CFD may be used to determine airflow patterns and air temperatures within the data center. When the thermal model is incorporated with the CFD model, the airflow patterns and air temperatures may be influenced by thermal effects from the walls of the enclosure.

Returning to FIGS. 1A and 1B, the inner surface layer 105a of the wall is coincident upon the face of an adjacent CFD interior cell 102 (which is three-dimensional (3D)), and has temperature $T_i$, and the inner surface layer 105a is thermally coupled to the interior volume of the enclosure. The center layer 105b represents the inside or interior of the wall itself (which is typically insulation) and has temperature $T_c$, and is thermally coupled to the inner surface layer 105a and the outer surface layer 105c. The outer layer 105c is thermally coupled to the ambient environment or prescribed exterior boundary conditions 104 (i.e., exterior or external environment), absorbs solar irradiance, as indicated by solar load 115, and has temperature $T_o$. According to at least one embodiment, the inner and outer layers 105a and 105c may be constructed from thin layers of metal material.

As indicated in FIGS. 1A and 1B, each of the inner layer 105a, center layer 105b, and outer layer 105c has a thermal capacitance 125a, 125b, and 125c, respectively. The thermal capacitance 125 may be a function of the physical properties of the material used to construct the respective layer and reflects the ability of the material to store heat energy. The thermal model also includes a plurality of nodes 110. In certain aspects, the thermal model may define the wall as a physical domain represented by the plurality of nodes in a three-dimensional space. The plurality of nodes in the three-dimensional space may be mapped onto a two-dimensional plane, as indicated in each of FIGS. 1A and 1B at 106.

Each layer 105a, 105b, and 105c is associated with at least one node 110, and as indicated in FIGS. 1A and 1B, each node is thermally coupled to an adjacent node by a thermal resistance 120. According to one embodiment, each node 110 may be a temperature node, and each layer 105a, 105b, and 105c is associated with one temperature node per distance $\Delta x$ in the wall-plane direction, where $\Delta x$ represents the characteristic dimension of the interior (CFD) cell 102. The magnitude of the thermal capacitance of each of the inner layer 105a, center layer 105b, and outer layer 105c, respectively, may be given by the following expressions:

Thermal capacitance for inner layer 105a:
$$C_i = \rho_i c_p^{\ i} l_i \Delta x^2$$

Thermal capacitance for center layer 105b:
$$C_c = \rho_c c_p^{\ c} l_c \Delta x^2$$

Thermal capacitance for outer layer 105c:
$$C_o = \rho_o c_p^{\ o} l_o \Delta x^2.$$

where
ρ represents density
$c_p$, represents specific heat
l represents the thickness of the wall layer The thermal model also includes at least one thermal resistance 120. Adjacent nodes may be thermally coupled to one another by a thermal resistance 120. In one embodiment, the thermal resistances 120 in the normal direction of the inner and outer layers 105a and 105c is assumed to be negligible given that these layers are typically thin and constructed of relatively high conductivity material, such as steel.

The thermal resistances 120 represent resistance to heat transfer along idealized flow paths and are shown as resistors in FIGS. 1A and 1B. To further illustrate, the center layer 105b of the wall conducts heat between the interior surface layer 105a and the exterior surface layer 105c, as well as to each of four neighboring nodes 110 (discussed in further detail below) that are positioned in neighboring adjacent two-dimensional wall regions. Each of these thermal resistances 120 is shown in FIGS. 1A and 1B. In accordance with some embodiments, each node 110 associated with a layer of the wall is coupled to six neighboring nodes via thermal resistances 120. For example, referring to FIG. 1B, the node 110 associated with temperature Tc of the center wall layer 105b is thermally coupled to $T_i$, $T_c^N$ (in-plane temperature node positioned "north" of $T_c$), $T_c^S$ (in-plane temperature node positioned "south" of $T_c$), $T_c^E$ (temperature node positioned "east" of $T_c$ (out-of-plane with FIG. 1B)), $T_c^W$ (temperature node positioned "west" of $T_c$ (out-of-plane with FIG. 1B)), and $T_o$ (temperature node associated with outer layer 105c). To further model the thermal path across the wall, the interior surface layer 105a is thermally coupled to the interior 3D cell 102 (interior volume of the enclosure) such that node 110 associated with temperature $T_i$ of the inner wall layer 105a is coupled to $T_i^N$ (in-plane temperature node positioned "north" (N) of $T_i$), $T_i^S$ (in-plane temperature node positioned "south" (S) of $T_i$), $T_i^E$ (temperature node positioned "east" (E) of $T_i$ (out-of-plane with FIG. 1B and therefore not shown in FIG. 1B)), $T_i^W$ (temperature node positioned "west" (W) of $T_i$ (out-of-plane with FIG. 1B and therefore not shown in FIG. 1B)), $T_I$ (temperature node associated with adjacent interior cell 102), and $T_c$ (temperature node associated with center layer 105b). To complete the thermal path across the wall, the outer surface layer 105c is thermally coupled to the ambient environment (denoted by exterior boundary conditions 104) such that node 110 associated with temperature $T_o$ of the outer wall layer 105c is coupled to $T_o^N$ (in-plane temperature node positioned "north" (N) of $T_o$), $T_o^S$ (in-plane temperature node positioned "south" (S) of $T_o$), $T_o^E$ (temperature node positioned "east" (E) of $T_o$ (out-of-plane with FIG. 1B), $T_o^W$ (temperature node positioned "west" (W) of $T_o$ (out-of-plane with FIG. 1B), $T_c$ (temperature node associated with adjacent center layer 105b), and $T_{amb}$ (temperature node associated with the exterior boundary conditions 104).

According to at least one embodiment, the thermal resistance 120 can be defined by the following expression:

$$R = l/k$$

where
k represents the thermal conductivity of the wall layer

As indicated in FIG. 1B, the center layer 105b is conductively coupled to the inner layer 105a and the outer layer 105c via resistances $(1-\lambda)R_c$ and $\lambda R_c$, respectively, and to its four adjacent center-layer neighbors via individual conductive resistances equal to $R_c(\Delta x/l_c)$. Thus, according to some embodiments, the thermal resistance is configured to account for thermal conductivity. According to various aspects, the thermal model implements the use of a weighting parameter λ (also referred to as a "tuning parameter") which can assume values from 0 to 1. The weighting parameter λ may be implemented to provide an additional degree of freedom by which the compact wall model may be "tuned" to better match benchmark data. The weighting parameter λ thus positions the center-layer (or other interior layer) node controlling how much relative thermal resistance is between it and the neighboring layers. This allows the position of the center-layer node to be varied to improve prediction accuracy. In this way, if the weighting parameter λ=0, $T_c=T_o$ (close coupling between the center layer and the outer layer), and if the weighting parameter λ=1, $T_c=T_i$ (close coupling between the center layer and the inner layer). It should be noted that, in the case of one-dimensional conduction normal to the wall, the value of λ has no effect under steady-state conditions. However, as all thermal mass is assumed concentrated at the nodes (and thermal mass is included for each wall layer), λ affects transient predictions for problems of any dimensionality. In certain instances the effect of the weighting parameter on the rate of transient temperature evolution is much greater than that on the spatial temperature distribution. For this reason, λ can be tuned to yield good transient predictions without sacrificing spatial temperature prediction accuracy.

Analogous to the above approach that conductively couples the center layer 105b to its adjacent center-layer neighbors via thermal resistances 120 of magnitude $R_c$, the inner and outer layers 105a and 105c are coupled to each of their own four contiguous inner- and outer-layer neighbors via conductive resistances $R_i=\Delta x/k_i$ and $R_o=\Delta x/k_o$. The outer layer 105c is both convectively and radiatively coupled to the exterior boundary conditions 104 such that $R_{amb}=1/(h_{conv}^o+h_{rad})$, where $h_{rad}$ is a linearized radiation heat transfer coefficient that depends on both the temperature of the wall and the ambient temperature. The inner layer 105a is either convectively or conductively coupled to its adjacent interior 3D cell 102 via $R_I$. The value of $R_I$ depends on whether the interior cell encloses air (the convective case), where $R_I=1/h_{conv}^I$ or a solid material (the conductive case), where $$R_I = \left(\frac{\Delta x}{2k_I}\right).$$

According to various aspects, the thermal model is also configured to account for heat transfer around edges and corners without adding any additional geometric complexity. This attribute is achieved by assuming that all adjacent wall sections are in the same two-dimensional plane regardless of the actual topology of the enclosure. Thus, the thermal resistance 120 between a node 110 associated with the center layer 105b (e.g., $T_c$) and its neighbors is the same regardless of whether the neighbor is "around a corner." For purposes of illustration, an analogy of an ant walking on the roof of the enclosure may be used. If the ant walks forward over the edge onto a vertical wall, it arrives at the neighbor of the 2D square region from where it began. Topologically, this movement is the same as if the ant had advanced forward to an adjacent 2D square region on a flat section of the roof. In this way, regardless of its position relative to an edge or corner of the wall, every 2D square region of the wall has precisely one neighbor adjacent to each of its four edges. This framework allows for the thermal wall model to preclude the geometric complexities that exist at intersecting wall sections or to implement specialized three-dimensional grids inside the wall. Thus, according to certain aspects the enclosure may include two adjacent exterior walls that lie on planes that intersect a long a straight line defined by an edge of the two adjacent walls, and the two-dimensional plane (e.g., 106 in FIGS. 1A and 1B) include the edge.

The thermal model may be expressed as one or more energy balance equations that may be used by a computing device, such as a processor, to predict or otherwise estimate the temperature of one or more locations (e.g., nodes) in the wall, including the temperature $T_i$ of the inner layer 105a, the temperature $T_c$ of the center layer 105b, and the temperature $T_o$ of the outer layer 105c. According to one embodiment, the desired expressions for $T_i$, $T_c$, and $T_o$ can be obtained by constructing or otherwise deriving a set of energy balance equations. For example, for the nodes 110 shown in FIG. 1B that correspond to each of $T_i$, $T_c$, and $T_o$, a set of three energy balance equations may be derived, where each equation represents the energy that flows into, the energy that flows out of, and the energy that is stored within a control volume surrounding one of the thermal model's three computational nodes (i.e., $T_i$, $T_c$, and $T_o$). Each energy flux term may then be replaced with a corresponding expression that is proportional to the particular cross-sectional area and temperature difference between the two given nodes, as well as inversely proportional to the magnitude of the thermal resistance 120 that couples the pair of nodes. Analogously, each energy storage (thermal mass) term may be substituted with an expression equal to $C_i(dT_i/dt)$, $C_c(dT_c/dt)$, or $C_0(dT_o/dt)$, as appropriate. Lastly, each of the three time derivatives may be discretized using an approximation of the form shown below in Equation (1):

$$\frac{dT}{dt} = \frac{T - T^{prev}}{\Delta t} \tag{1}$$

where
Δt represents a finite duration of time (the "time step")
T is the current temperature of the given node
$T^{prev}$ is the temperature of the same node at the previous time step The transient thermal mass resistance for each layer may also be defined as:

$$R_i^M = \frac{\Delta t}{\rho_i c_p^i l_i}$$

$$R_c^M = \frac{\Delta t}{\rho_c c_p^c l_c}$$

$$R_o^M = \frac{\Delta t}{\rho_o c_p^o l_o}$$

The above approach may be used to derive three algebraic expressions for $T_i$, $T_c$, and $T_o$. The temperature $T_i$ of the inner wall 105a is given by Equations (2a)-(2c) below:

$$T_i = R_i^{eq}\left\{\frac{T_c}{(1-\lambda)R_c} + \frac{T_I}{R_I} + \left(\frac{1}{R_i}\right)\left(\frac{l_i}{\Delta x}\right)\Sigma(T_i)_n + \frac{T_i^{prev}}{R_i^M}\right\} \tag{2a}$$

where:

$$R_i^{eq} = 1/\left\{\frac{1}{(1-\lambda)R_c} + \frac{1}{R_I} + \left(\frac{n}{R_i}\right)\left(\frac{l_i}{\Delta x}\right) + \frac{1}{R_i^M}\right\} \tag{2b}$$

and $$\Sigma(T_i)_n = T_i^N + T_i^S + T_i^E + T_i^W \tag{2c}$$

It is noted that in Equation (2c) (and Equations (3c) and (4c) discussed below), n represents the number of neighboring conducting nodes that border the node of focus. For example, if the node of focus has one adiabatic side (e.g., is adjacent to a window, door, vent, or other opening in the wall), n=3, whereas if the node of focus is in the middle of a solid wall or on an edge or corner that is not adjacent to any opening, n=4. In rarer cases, when the opening is L-shaped or U-shaped, instances can arise where a node of focus has only one or two conducting neighbor(s) such that n=1 or n=2, respectively.

The temperature $T_c$ of the center wall 105b is given by Equations (3a)-(3c) below:

$$T_c = R_c^{eq}\left\{\left(\frac{1}{R_c}\right)\left(\frac{T_o}{\lambda} + \frac{T_i}{1-\lambda}\right) + \left(\frac{1}{R_c}\right)\left(\frac{l_c}{\Delta x}\right)^2 \Sigma(T_c)_n + \frac{T_c^{prev}}{R_c^M}\right\} \quad (3a)$$

where:

$$R_c^{eq} = 1/\left\{\frac{1}{R_c}\left(\frac{1}{\lambda} + \frac{1}{1-\lambda}\right) + \left(\frac{n}{R_c}\right)\left(\frac{l_c}{\Delta x}\right)^2 + \frac{1}{R_c^M}\right\} \quad (3b)$$

and $$\Sigma(T_c)_n = T_c^N + T_c^S + T_c^E + T_c^W \quad (3c)$$

Lastly, the temperature $T_o$ of the outer wall 105c is given by Equations (4a)-(4c) below:

$$T_o = R_o^{eq}\left\{q_{sol}'' + \frac{T_c}{\lambda R_c} + \frac{T_{amb}}{R_{amb}} + \left(\frac{1}{R_o}\right)\left(\frac{l_o}{\Delta x}\right)\Sigma(T_o)_n + \frac{T_o^{prev}}{R_o^M}\right\} \quad (4a)$$

where
$q_{sol}''$ represents the portion of the incident solar load per unit area which is absorbed by the outer layer and is at least partially dependent on the solar reflectivity value of the wall material, $$R_o^{eq} = 1/\left\{\frac{1}{\lambda R_c} + \frac{1}{R_{amb}} + \left(\frac{n}{R_o}\right)\left(\frac{l_o}{\Delta x}\right) + \frac{1}{R_o^M}\right\} \quad (4b)$$

and $$\Sigma(T_o)_n = T_o^N + T_o^S + T_o^E + T_o^W \quad (4c)$$

The solar load is a function of the enclosure's geographic location and orientation, as well as solar time, and can be determined by performing calculations as described in the literature, such as in the ASHRAE Handbook: Fundamentals 2017, Chapter 14, *Climatic Design Information*, or in other standardized resources, and using solar intensity data. In accordance with certain aspects, $q_{sol}''$ need only be constant at a given time step at a given node and may otherwise vary, e.g., as the relative sun position moves throughout the day.

According to one embodiment, solar load may be determined using a sensor device. For instance, in some instances measurements from a photovoltaic cell positioned in proximity to the outer wall layer 105c and the incident solar energy may be used in determining the solar load. The efficiency of the solar cell can be used in computing the total incident thermal load on the wall. According to another example, a sensor device such as a pyranometer can be used to directly measure solar load.

Equations 2-4 are implicit, as each Equation includes other unknowns, and therefore must be solved simultaneously. The implicit equations may be solved iteratively, either separately or as part of iterations within a parent (CFD or other) analysis. However, according to at least one embodiment, these equations may be solved analytically for explicit equations for $T_i$, $T_c$, and $T_o$. Although more complex algebraically, the explicit versions of Equations 2-4 can be evaluated sequentially at every time step without additional iteration.

The compact wall model presented above uses heat transfer physics to account for the individual mechanisms of, and resistance to, heat flows across each of the wall-section's four types of interfaces: (1) between the wall and the adjacent medium inside the room (convection, conduction, and radiation), (2) between the wall and the adjacent medium outside the room (convection, conduction, and radiation, as well as incident solar load on the wall), (3) in the plane of the wall (self-conduction inside the wall), and (4) perpendicular to the plane of the wall (self-conduction inside the wall).

Equations 2-4 represent a three-layer embodiment of the thermal model presented herein. As discussed in the Examples below, the thermal model provides good (both spatial and temporal) estimates of the inner and outer wall layer 105a and 105c temperatures $T_i$ and $T_o$, and also accurately models the heat sink (or spreading) effect of the inner wall layer 105a. Alternative embodiments of the thermal model are also within the scope of this disclosure. For example, thermal models using only one or two layers may also be used and implemented by taking the appropriate limits of Equations 2-4, or by repeating the above analysis for the specific construction of interest. Similarly, the thermal model may be extended to handle more complex walls with more than three individual layers, or walls with thermal breaks, thermal short circuits, or contact resistances. The thermal model may also be generalized to work with non-uniform interior (CFD) grid schemes.

According to some embodiments, the results obtained from solving the set of energy balance equations associated with the thermal model described above may be used to predict temperatures in the data center, including inlet temperatures to at least one equipment rack and/or an outlet temperature of cooling fluid (e.g., air, water), associated with the cooling equipment. The thermal model may be used for adjusting one or more operating parameters of equipment in the data center, such as the equipment racks and/or cooling providers based on the predicted temperature values. For instance, a flowrate of a fluid (water, refrigerant, air) associated with a cooler may be adjusted, or electrical power associated with at least one equipment rack may be adjusted. In some instances, the adjustment may be performed to ensure that sufficient cooling is provided such that the maximum temperature of the data center or its components is not currently exceeded or not exceeded under some expected future condition. In other instances, the adjustment may be performed for conserving energy or otherwise minimizing energy consumption. According to some embodiments, a design of a data center may be altered based on the predicted temperature. For example, a user of the data center design and management system may change the location of coolers or the types of coolers that are used in the actual layout of equipment or the proposed layout of equipment in the data center. These alterations may be implemented to improve the cooling performance and/or may be implemented to provide cost and/or power savings when the performance is found to be within predetermined specifications. In addition, predicted temperature values or other information (e.g., weather forecast) may be used to implement other types of actions, such as storing additional chilled water, or pre-cooling the facility (e.g., in anticipation of hot weather or power disruption).

Figure 3:
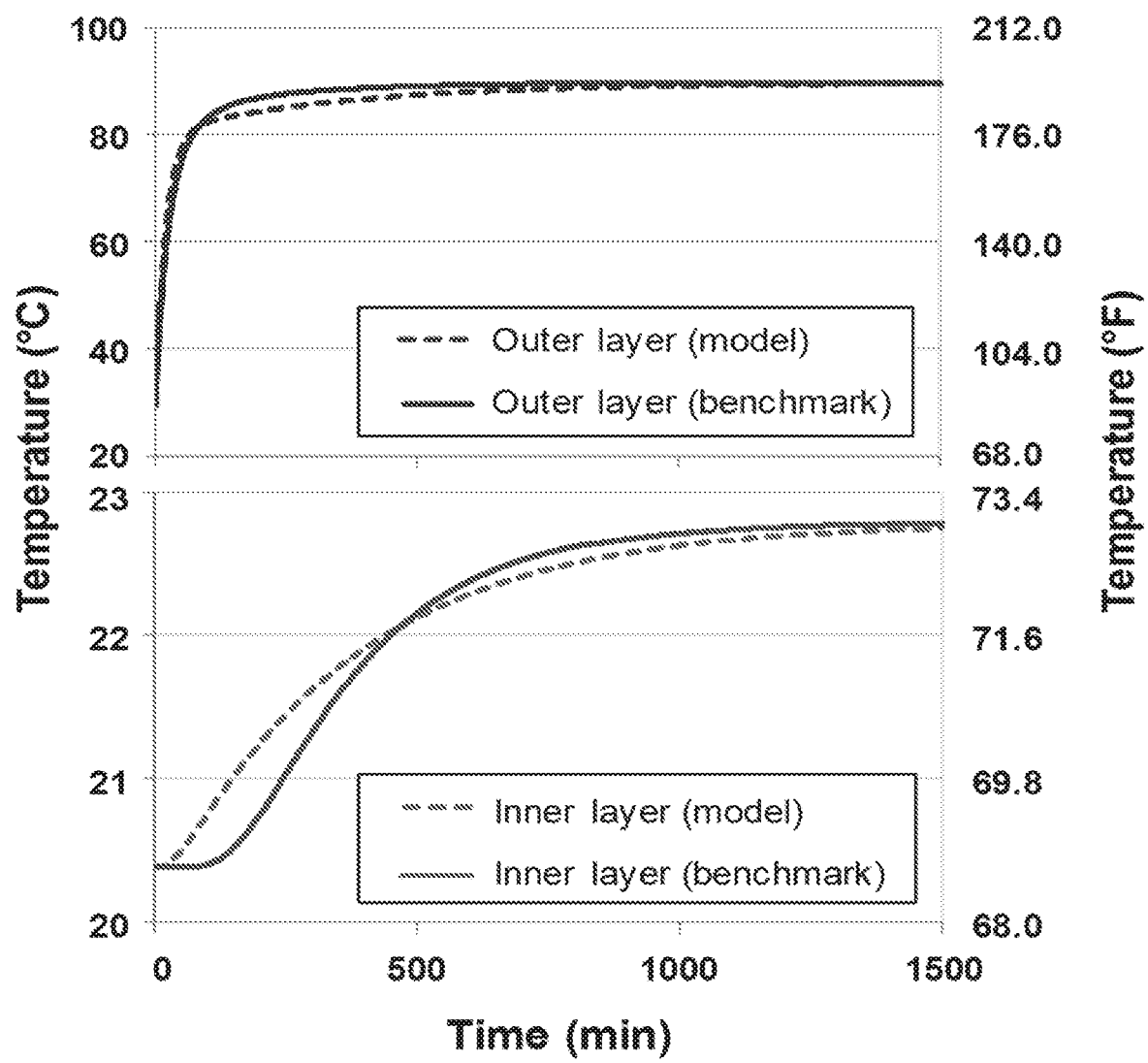
FIG. 3 is a graph of comparison temperature data over time in accordance with one or more aspects of the invention.

The results from the model may also be used to generate or otherwise provide a display or other type of visualization, such as those described herein in reference to FIG. 3 and FIG. 5, on a display device. For instance, the temperature prediction profiles generated from the model may be displayed to a user, and/or can be used for monitoring or controlling one or more components of the data center. For instance, the temperature prediction profile may yield information, such as the length of time one or more layers of the wall reach a steady state temperature, and/or the values of the maximum and minimum temperature of one or more layers of the wall, which can be used for controlling cooling equipment or equipment racks by a user or by a controller. In another example, when the thermal wall model is integrated with a CFD model of the data center, a two- or three-dimensional visualization of the data center may be displayed to a user that includes results from the combined model, such as thermal effects (e.g., temperature gradients or values, airflow, etc.). As discussed in further detail below, the results from the model may be displayed as part of the implementation of a design system, as discussed further below. According to another example, results from the model may be used to provide warnings, error messages, alarms, or other information to a user (e.g., data center manager).

According to some embodiments, the thermal wall model may be incorporated into a data center design system, which may be a stand-alone tool or may be built into a data center design platform, including a web-based software tool. This design aspect may be used to guide data center personnel through activities such as designing the data center structure, positioning equipment within the data centers prior to installation and repositioning equipment after construction and installation are complete. The design and accompanying analysis may allow the user to create models of data center configurations from which performance metrics (e.g., inlet and outlet temperatures of equipment racks and/or coolers) may be determined. Both the system and the user may then employ these performance metrics to determine alternative systems configurations that meet various design objectives. An optimized design can thus be obtained, and the results of the model may be used as part of a system to implement the design, e.g., to order equipment, ship equipment, and/or install equipment in a data center as per the optimized designed layout. In addition, the design of an existing data center may also be altered based on the results of the model. For instance, a user may change the location of components and/or cooling equipment to improve the performance of the data center, such as by reducing power consumption or other cost savings when the performance is found to be within predetermined specifications.

In at least some embodiments described above, tools and processes are provided for determining temperatures and airflows in a data center. In other embodiments, the tools and processes may be used in other types of facilities, and may also be used in mobile applications, including modular data centers. For example, according to some embodiments, a controller or processor implemented as part of a computing system as discussed in further detail below may be located in or used as part of a modular data center to monitor and control various aspects of the data center, such as one or more operating parameters (e.g., cooling settings, flowrates, etc.). In some instances the controller may be configured to predict certain conditions, such as external conditions, such as solar load and temperature (e.g., from a weather forecast), and/or internal conditions, such as power consumption, etc., and incorporate or otherwise implement this information with the model in managing and controlling the data center.

Although the above discussion is mainly directed to data centers, it is to be appreciated that the models may also be applied to other types of enclosures, including modular and prefabricated enclosures that are not "data centers." For instance, the models may be applied to a modular substation such as an electrical substation, grid-scale energy storage systems, wind and solar energy support systems, and hydroponic farming systems, or other non-data center applications.

The methodology and techniques described with respect to the exemplary embodiments can be performed using a machine or other computing device within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment.

In some embodiments, one or more of the methods disclosed herein may be implemented on a computerized control system. Various aspects may be implemented as specialized software executing in a general-purpose or specialized computer system 600 such as that shown in FIG. 6. The computer system 600 may include a processor 603 (also referred to herein as a controller) connected to one or more memory devices 617, such as a disk drive, solid state memory, or other device for storing data. Memory 617 is typically used for storing programs and data during operation of the computer system 600.

The processor 603 may be any device capable of executing a set of instructions (sequential or otherwise) that specify actions to be taken by that processing device. Further, while a single processor is illustrated, the term "processor" shall also be taken to include any collection of processors that individually or jointly execute a set (or multiple sets) of instructions to perform any one or more of the methodologies discussed herein.

Components of computer system 600 may be coupled by an interconnection mechanism 607 (also referred to herein as an interconnect system), which may include one or more busses (e.g., between components that are integrated within a same machine) and/or a network. The interconnection mechanism 607 enables communications (e.g., data, instructions) to be exchanged between system components of system 600. Computer system 600 includes one or more input devices 609, for example, a keyboard, mouse, trackball, microphone, a disk drive unit, a signal generation device (e.g., a speaker or remote control), or touch screen through which a user may issue commands, data input, or programming to the system 600. In some embodiments the computer system 600 may include or be coupled to or in communication with one or more input devices 609 configured to communicate with facility systems 619 of a facility, for example, equipment associated with a data center, such as cooling equipment or IT equipment. Computer system 600 includes one or more output devices 621, for example, a printing device, speaker, and/or display devices, such as a display screen (e.g., a liquid crystal displays (LCD), a flat panel, a solid state display, or a cathode ray tube (CRT)). In some embodiments, the computer system 600 may include or be coupled to or in communication with the interconnection mechanism 607 to provide control signals to adjust one or more operating parameters of facility systems 619 of a facility. One or more sensors 613 may also provide input to the computer system 600. These sensors may include, for example, sensors which are capable of or are configured to measure one or more parameters external or internal to the data center, such as temperature, humidity, flow rate, airflow, solar intensity, power, flowrate, etc. In addition, computer system 600 may contain one or more interfaces (not shown) that connect computer system 600 to a communication network in addition to or as an alternative to the interconnection mechanism 607. These interfaces may be utilized by the central processing unit to collect data, for example, weather or solar data, from an external source such as a weather reporting service web site on the Internet.

Figure 7:
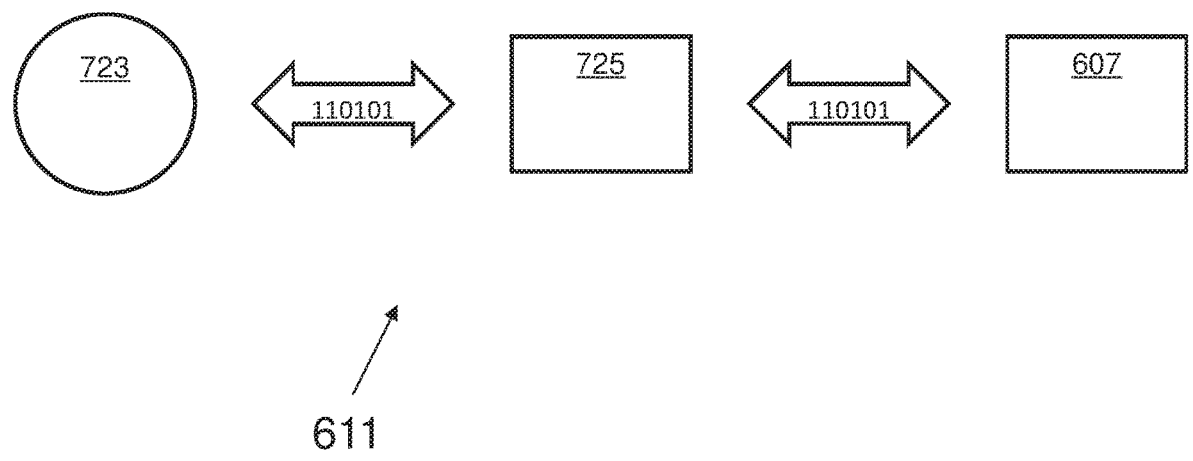
FIG. 7 is a schematic illustration of a memory system for the computer system of FIG. 6.

The storage system 611, shown in greater detail in FIG. 7, typically includes a computer readable and writeable nonvolatile recording medium 723 in which signals are stored that define a program to be executed by the processor or information to be processed by the program. The medium may include, for example, a disk or flash memory. Typically, in operation, the processor causes data to be read from the nonvolatile recording medium 723 into another memory 725 that allows for faster access to the information by the processor than does the medium 723. This memory 725 is typically a volatile, random access integrated circuit memory such as a dynamic random access memory (DRAM) or static memory (SRAM). It may be located in storage system 611, as shown, or in memory system 617. The processor 603 generally manipulates the data within the integrated circuit memory 617 and then copies the data to the medium 723 after processing is completed. A variety of mechanisms are known for managing data movement between the medium 723 and the integrated circuit memory element 617, and embodiments disclosed herein are not limited to any particular data movement mechanism. Embodiments disclosed herein are not limited to a particular memory system 617 or storage system 611.

The computer system may include specially-programmed, special-purpose hardware, for example, an application-specific integrated circuit (ASIC). Embodiments disclosed herein may be implemented in software, hardware or firmware, or any combination thereof. Further, such methods, acts, systems, system elements and components thereof may be implemented as part of the computer system described above or as an independent component.

Figure 6:
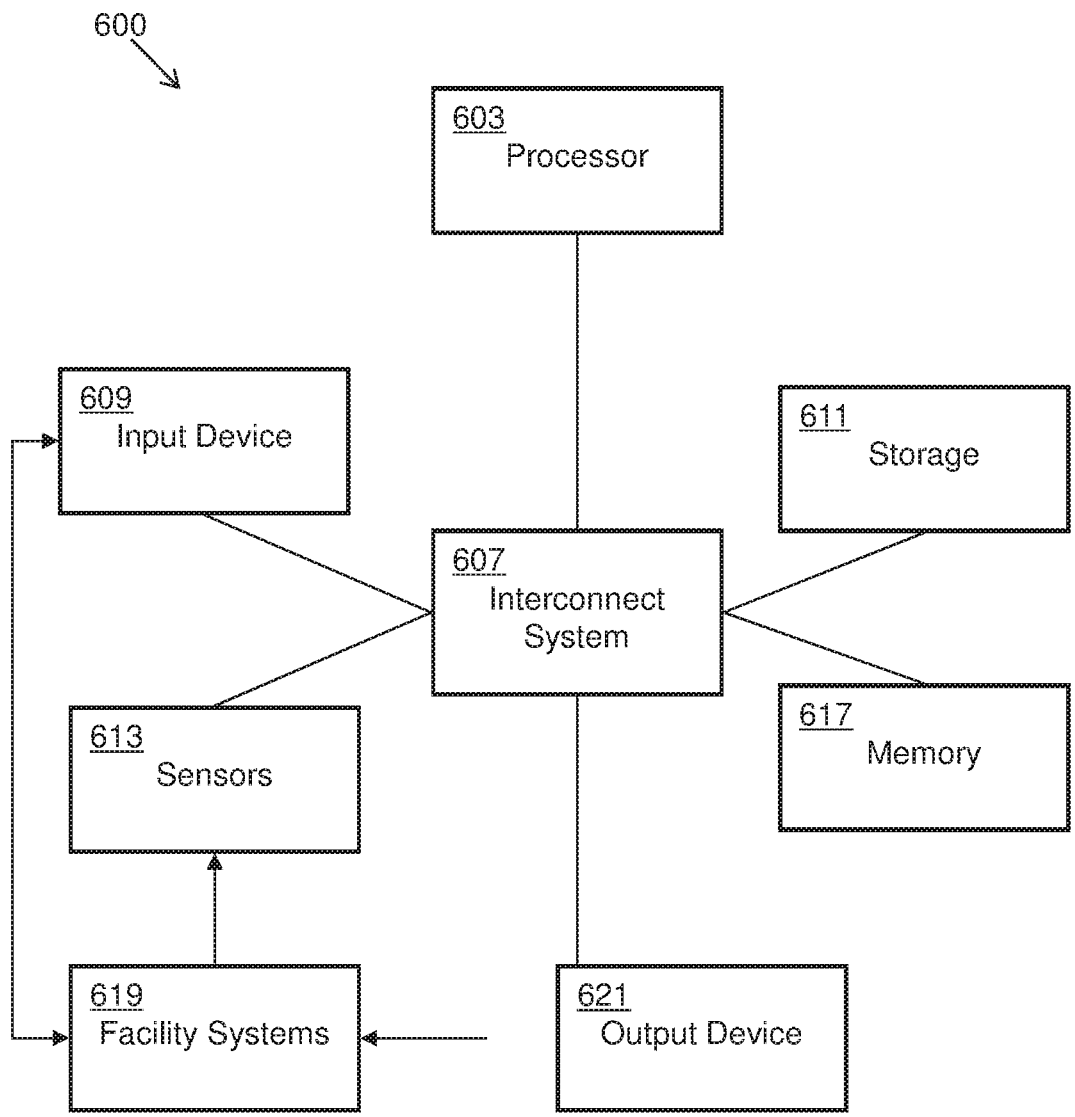
FIG. 6 is a schematic illustration of a computer system upon which methods disclosed herein may be performed.

Although computer system 600 is shown by way of example as one type of computer system upon which various embodiments disclosed herein may be practiced, it should be appreciated that the embodiments disclosed herein are not limited to being implemented on the computer system as shown in FIG. 6. Various embodiments disclosed herein may be practiced on one or more computers having a different architecture or components that that shown in FIG. 6.

Computer system 600 may be a general-purpose computer system that is programmable using a high-level computer programming language. Computer system 600 may be also implemented using specially programmed, special purpose hardware. In computer system 600, processor 603 is typically a commercially available processor such as the well-known Pentium™ or Core™ class processors available from the Intel Corporation. Many other processors are available. Such a processor usually executes an operating system which may be, for example, the Windows 7 or Windows 8 operating system available from the Microsoft Corporation, the MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that embodiments disclosed herein are not limited to a particular computer system platform, processor, operating system, or network. Also, it should be apparent to those skilled in the art that the embodiments disclosed herein are not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various embodiments disclosed herein may be distributed among one or more computer systems configured to provide a service (e.g., servers) to one or more client computers, or to perform an overall task as part of a distributed system. For example, various embodiments disclosed herein may be performed on a client-server system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). In some embodiments one or more components of the computer system 600 may communicate with one or more other components over a wireless network, including, for example, a cellular telephone network.

It should be appreciated that embodiments disclosed herein are not limited to executing on any particular system or group of systems. Also, it should be appreciated that embodiments disclosed herein are not limited to any particular distributed architecture, network, or communication protocol. Various embodiments may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various embodiments disclosed herein may be implemented in a non-programmed environment (e.g., documents created in HTML, XML or other format that, when viewed in a window of a browser program, render aspects of a graphical-user interface (GUI) or perform other functions). Various embodiments disclosed herein may be implemented as programmed or non-programmed elements, or any combination thereof.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, example systems are applicable to software, firmware, and hardware implementations.

EXAMPLES

The function and advantage of the embodiments of the thermal model disclosed herein will be more fully understood from the examples below. The following examples are intended to illustrate the benefits of the disclosed modeling approach, but do not in any way limit the full scope thereof.

Example of One-Dimensional Transient Conduction

Figure 2:
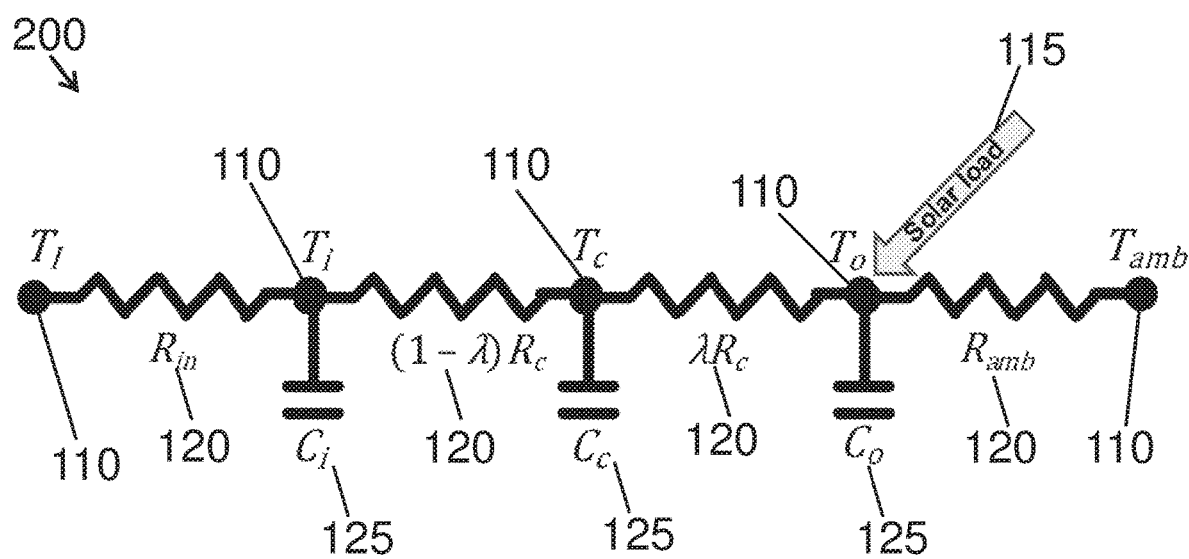
FIG. 2 is a schematic diagram showing a 1D view of an example of a thermal model in accordance with one or more aspects of the invention.

As one example of the capabilities of the thermal model disclosed herein, a one-dimensional transient scenario with a solar load is presented. A one-dimensional version 200 of the thermal model is shown in thermal-network form in FIG. 2. The wall has the physical properties as summarized in Table 1 below, which corresponds to inner and outer layers constructed from steel and separated by insulation. In addition, the inner and outer heat transfer coefficients are assumed to be 8 W/(m²° C.) [1.4 Btu/(hr ft²° F.)], while the enclosure's interior and external temperatures are held constant at $T_I$=20° C. [68.0° F.] and $T_{amb}$=30° C. [86.0° F.], respectively, which are considered to be realistic values for modular enclosures located outdoors. The thermal conductivity k of the outer and inner walls is not used in the one-dimensional thermal wall model 200 as it is assumed that the resistance to conduction is negligible in the normal direction.

TABLE 1

Physical Properties of Example Wall

| Wall Layer | l(mm)[in] | $k\left(\frac{W}{m° C.}\right)\left[\frac{BTU}{hrft° F.}\right]$ | $\rho\left(\frac{kg}{m^3}\right)\left[\frac{lbm}{ft^3}\right]$ | $c_p\left(\frac{J}{kgm^3}\right)\left[\frac{Btu}{lbmft^3}\right]$ |
|---|---|---|---|---|
| Outer | 3 [0.12] | 50 [30] | 7833 [488] | 465 [0.111] |
| Center | 150 [5.9] | 0.05 [0.03] | 250 [15.6] | 1,000 [0.239] |
| Inner | 3 [0.12] | 50 [30] | 7833 [488] | 465 [0.111] |

At time t=0, a constant (absorbed) solar load 115 of 500 W/m² [159 Btu/(hr ft²)] is suddenly applied to the outer wall layer. The value used for the solar load is considered to be realistic, given that the average solar flux at sea level on Earth is approximately 1,000 W/m² [317 Btu/(hr ft²)], and half of that intensity is assumed to be reflected away from the wall's outer surface. Beginning and ending steady-state temperatures, as well as intermediate transient temperatures for the inner and outer wall layers were determined, and compared to a detailed benchmark solution.

The discretized one-dimensional thermal model 200 was solved using a spreadsheet in which each row corresponded to temperature calculations at a given time step. However, since implicit equations of the form of Equations 2-4 were employed, temperatures at each time step were solved using Gauss-Seidel iteration. The results from the one-dimensional thermal model 200 were compared to a detailed one-dimensional numerical benchmark solution created with a commercial CFD software tool (FloVENT® 11.3 software (supplied by Mentor Graphics)). The benchmark model featured 50 grid cells across the center layer and 4 grid cells across the inner and outer layers. A time step size of 100 seconds was found to be conservatively small and was used in both the compact thermal model and the benchmark model. The models were time-step independent for time steps ranging from 1 second to 250 seconds.

FIG. 3 compares the compact model inner and outer layer temperature predictions to those of the benchmark. The center layer temperatures are not shown since these temperatures do not affect the airflow or thermal solution inside the enclosure or heat transfer through the wall. For the thermal model predictions, the weighting parameter λ was assigned to be equal to 0.2, which produced a good fit to the benchmark data for both layers. The thermal model accurately predicted both the beginning and ending steady-state temperatures and also reasonably captured the rate of temperature rise for the inner and outer wall layers. The inner-layer temperatures predicted by the thermal model lagged the benchmark values at earlier times. This result relates to the assumption that all center-layer mass is concentrated at a single node which is more immediately accessible to the applied solar load than in reality. For instance, in the real wall, each infinitesimal layer of the wall must absorb heat, increase in temperature, and then conduct heat to the subsequent layer.

The "best" weighting parameter λ value may depend on the application and also the accuracy goals for a given application. For example, if external conditions remain constant while internal equipment (possibly in contact with the inner wall) heat dissipation changes rapidly, a value of λ closer to 1 may be a better choice. Lacking any particular use-case information, a λ value of 0.5 (i.e., locating the center-layer node in the middle of the wall) was found to be a reasonable choice.

Table 2 summarizes the model's accuracy in terms of maximum error and relative root mean square error (% RMSE), and provides values of these metrics for both the outer-layer and inner-layer temperature predictions. The root mean square error % RMSE may be expressed as shown below in Equation (5):

$$\% \ RMSE = \sqrt{\frac{1}{n}\sum_{i=1}^{n}\left(\frac{T_{model,i} - T_{benchmark,i}}{T_{max} - T_{min}}\right)^2} \quad (5)$$

where
n is the number of points of comparison
$T_{model,i}$ and $T_{benchmark,i}$ are the predicted and benchmark temperatures, respectively, over time
$T_{max}$ and $T_{min}$ are the maximum and minimum temperatures, respectively, of the benchmark case at each respective layer

TABLE 2

Summary of One-Dimensional Thermal Model Accuracy

| Wall Layer | Maximum Range (° C.) [° F.] | Maximum Error (° C.) [° F.] | % RMSE |
|---|---|---|---|
| Outer | 60.1 [108.2] | 2.4 [4.3] | 2.1 |
| Inner | 2.4 [4.3] | 0.4 [0.7] | 7.0 |

The maximum error at the outer and inner layers, as a percentage of the maximum temperature range at each respective layer, was 4.0% (at t=16 minutes) and 16.7% (at t=175 minutes), respectively. The RMSE, expressed as a percentage of each layer's maximum range, was significantly smaller, at 2.1% and 7.0% for the outer and inner layer, respectively.

The results from the model also indicated that the outer wall layer reached steady state after roughly an hour or two, while the inner layer required closer to 10 hours. Thus, for practical considerations, the outer wall skin quickly heats up in the sun while the inner skin may not "feel" the effects until the sun is at a much different position in the sky.

Example—Three-Dimensional Steady-State Conduction

Figure 4:
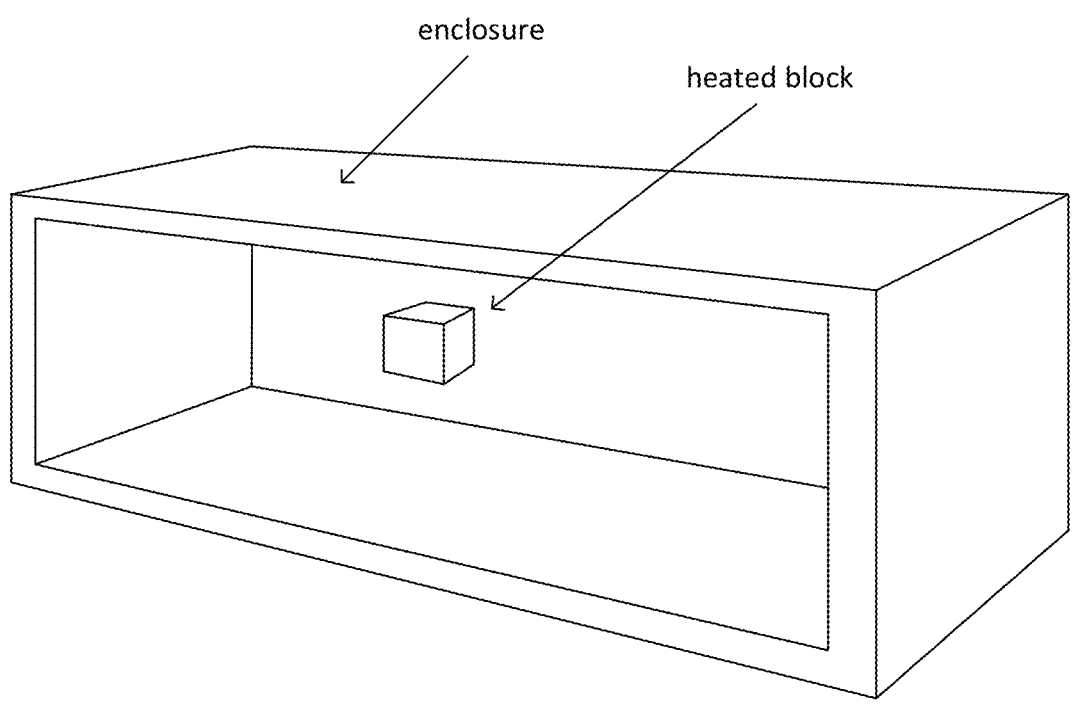
FIG. 4 is a schematic of a heated block in an enclosure in accordance with one or more aspects of the invention.

A second example highlights the thermal wall model's ability to accurately predict lateral conduction even though the model is physically two-dimensional, and is thus capable of capturing "heat sink" effects such as hot objects placed against the inside of the wall of the enclosure. FIG. 4 shows a single heated block in an enclosure where the walls are of identical construction to that of the previous example (Table 1) and the internal dimensions are 2.7 m [8.9 ft]×2.7 m [8.9 ft]×7.5 m [18.3 ft]. The heated block is 600 mm [2.0 ft] in each dimension and is centered on one of the long walls as shown. The block has a thermal conductivity of 100 W/(m° C.) [57.7 Btu/(hr ft° F.)] and dissipates 100 W [341 Btu/hr] of heat uniformly throughout its volume. The external ambient on all sides of the container was considered to be at 20° C. [68° F.] and an external-wall heat transfer coefficient of 10 W/(m$^{2°}$ C.) [1.8 Btu/(hr ft$^{2°}$ F.)] was assumed. For reference, the interior (CFD) grid, which is the same as the wall grid in the lateral directions (uniform 150 mm [5.9 in] cells), is also shown in FIG. 4.

The thermal wall model was implemented in a proprietary 3D CFD software design tool which is compared here to a numerical detailed benchmark solution created with commercial CFD software (FloVENT® 11.3 software (supplied by Mentor Graphics)). As with the previous example, the weighting parameter λ has again been taken as 0.2 in the thermal model. In the benchmark simulation, the three wall layers are modeled explicitly, again with 4 grid cells across the thickness of the inner and outer layers. In order to ensure that the focus of the comparison is, to the extent possible, on the wall model and not the other physical and numerical models employed in the tools, zero airflow was assumed and only conduction heat transfer was simulated.

FIGS. 5A-5C compare the compact wall model and benchmark predictions of temperatures over the surface of the inner wall layer immediately behind (and in contact with) the heat-dissipating block. FIG. 5A shows the temperatures predicted by the combined CFD/thermal model for the inner wall layer, FIG. 5B shows the temperatures predicted by the numerical benchmark solution, and FIG. 5C shows the differences between the predicted temperatures of FIGS. 5A and 5B. The results indicated that strong agreement was observed between the models in both absolute temperature values and the qualitative distribution. The maximum difference observed was equal to 0.80° C. [1.4° F.], and occurred at a position on the wall corresponding to the center of the heat-dissipating block. Differences in predicted (static) air temperatures were on the order of 0.5° C. [0.9° F.] or less. In all cases, the thermal wall model over-predicted temperatures relative to those of the benchmark case. As seen in FIGS. 5A and 5C, despite being physically two-dimensional, the thermal model accurately accounted for lateral heat conduction. Although not shown in FIGS. 5A-5C, the difference between the thermal wall model and the benchmark temperatures are, at most, 0.1° C. [0.2° F.] over the corresponding outside wall of the enclosure. It was also found that the weighting parameter λ does not significantly influence the thermal wall model's steady state two-dimensional predictions, and therefore the weighting parameter λ value of 0.2 obtained in the previous example for the one-dimensional transient case may also be used for transient-external-solar-load applications.

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls. Moreover, titles or subtitles may be used in the specification for the convenience of a reader, which shall have no influence on the scope of the present invention.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A method, comprising:
receiving input data related to an enclosure, the input data including solar intensity data on an exterior of a wall of the enclosure;
generating, by a processor, a thermal model of a wall of the enclosure based at least in part on the input data, the wall modeled as having a plurality of layers and the thermal model including a plurality of nodes having three-dimensional positions, each layer of the plurality of layers being associated with at least one node of the plurality of nodes and each node of the plurality of nodes being thermally coupled to an adjacent node by a thermal resistance;

mapping, by the processor, the three-dimensional positions of the plurality of nodes to two-dimensional positions;

assigning a weighting parameter to at least one node of the plurality of nodes, the weighting parameter determining a proximity of the at least one node of the plurality of nodes to a different node of the plurality of nodes;

solving, by the processor, an energy balance equation corresponding to the two-dimensional positions of the plurality of nodes to determine a predicted temperature for at least one node, the two dimensional positions of at least two nodes of the plurality of nodes being determined based on the proximity of the at least one node of the plurality of nodes to the different node of the plurality of nodes; and output the predicted temperature to a display device.

2. The method of claim 1, wherein generating the thermal model includes identifying the plurality of layers of the wall as an inner surface layer thermally coupled to an interior volume of the enclosure, an outer surface layer including the exterior of the wall and thermally coupled to an ambient environment, and a center layer thermally coupled to the inner surface layer and the outer surface layer, and identifying an overall thermal resistance between a node associated with the inner surface layer and a node associated with the outer surface layer.

3. The method of claim 2, wherein the thermal resistance is configured to account for thermal conductivity such that a first node associated with the center layer is conductively coupled to the node associated with the inner surface layer, the node associated with the outer surface layer, and to a second, third, fourth, and fifth adjacent node associated with the center layer.

4. The method of claim 3, wherein the weighting parameter is assigned to the first node.

5. The method of claim 4, further comprising applying the weighting parameter to the overall thermal resistance to determine a first thermal resistance between the first node and the node associated with the inner surface layer and to determine a second thermal resistance between the first node and the node associated with the outer surface layer.

6. The method of claim 1, wherein solving the energy balance equation includes solving the energy balance equation corresponding to the two-dimensional positions of the plurality of nodes at a plurality of time steps to determine a predicted temperature change at the at least one node over time.

7. The method of claim 1, wherein solving the energy balance equation includes compensating for solar load based on the solar intensity data.

8. The method of claim 1, wherein generating the thermal model includes defining the wall as a physical domain represented by the three-dimensional positions of the plurality of nodes.

9. The method of claim 8 wherein the enclosure includes two adjacent exterior walls that lie on planes that intersect along a straight line defined by an edge of the two adjacent exterior walls, and the two-dimensional plane includes the edge.

10. The method of claim 1, further comprising incorporating the thermal model with a CFD model of an interior volume of the enclosure.

11. The method of claim 10, wherein the CFD model of the interior volume is represented by a grid that forms a plurality of cells, the plurality of cells including a plurality of interior cells that are adjacent to an inner layer of the plurality of layers.

12. The method of claim 10, further comprising implementing a design of the interior volume based on the CFD model.

13. The method of claim 1, further comprising using, by the processor, the predicted temperature to adjust an operating parameter of equipment in the interior volume.

14. The system of claim 13, wherein the controller is configured to incorporate the thermal model with a CFD model of an interior volume of the enclosure.

15. The system of claim 14, wherein the CFD model of the interior volume is represented by a grid that forms a plurality of cells, the plurality of cells including a plurality of interior cells that are adjacent to an inner layer of the plurality of layers.

16. A system comprising:
a storage device;
a display device;
a controller coupled to the storage device and the display device and configured to:
receive input data from the storage device related to an enclosure, the input data including solar intensity data on an exterior of a wall of the enclosure;
generate a thermal model of a wall of the enclosure based at least in part on the input data, the wall modeled as having a plurality of layers and the thermal model including a plurality of nodes having three-dimensional positions, each layer of the plurality of layers being associated with at least one node of the plurality of nodes and each node of the plurality of nodes being thermally coupled to an adjacent node by a thermal resistance;
assign a weighting parameter to at least one node of the plurality of nodes, the weighting parameter determining a proximity of the at least one node of the plurality of nodes to a different node of the plurality of nodes;
map the three-dimensional positions of the plurality of nodes to two-dimensional positions;
solve an energy balance equation corresponding to the two-dimensional positions of the plurality of nodes to determine a predicted temperature for at least one node, the two dimensional positions of at least two nodes of the plurality of nodes being determined based on the proximity of the at least one node of the plurality of nodes to the different node of the plurality of nodes; and
output the predicted temperature to the display device.

17. The system of claim 16, wherein generating the thermal model includes identifying the plurality of layers of the wall as an inner surface layer thermally coupled to an interior volume of the enclosure, an outer surface layer including the exterior of the wall and thermally coupled to an ambient environment, and a center layer thermally coupled to the inner surface layer and the outer surface layer, and identifying an overall thermal resistance between a node associated with the inner surface layer and a node associated with the outer surface layer.

18. The system of claim 17, wherein the thermal resistance is configured to account for thermal conductivity such that a first node associated with the center layer is conductively coupled to the node associated with the inner surface layer, the node associated with the outer surface layer, and to a second, third, fourth, and fifth adjacent node associated with the center layer.

19. The system of claim 18, wherein the controller is further configured to apply the weighting parameter to the first node.

20. The system of claim 19, wherein the controller is further configured to apply the weighting parameter to the overall thermal resistance to determine a first thermal resistance between the first node and the node associated with the inner surface layer, and determine a second thermal resistance between the first node and the node associated with the outer surface layer.

21. The system of claim 16, wherein solving the energy balance equation includes solving the energy balance equation corresponding to the two- dimensional positions of the plurality of nodes at a plurality of time steps to determine a predicted temperature change at the at least one node over time.

22. The system of claim 16, further comprising at least one sensor coupled to the storage device and configured to measure the solar intensity data.

23. The system of claim 22, wherein solving the energy balance equation includes compensating for solar load based on the solar intensity data.

24. The system of claim 16, wherein generating the thermal model includes defining the wall as a physical domain represented by the three-dimensional positions of the plurality of nodes.

25. The system of claim 24, wherein the enclosure includes two adjacent exterior walls that lie on planes that intersect along a straight line defined by an edge of the two adjacent exterior walls, and the two-dimensional plane includes the edge.

26. The system of claim 16, wherein the controller is further configured to adjust an operating parameter of equipment in the enclosure using the predicted temperature.

27. A non-transitory computer-readable medium containing thereon computer- executable instructions instructing at least one processor to:
process input data including solar intensity data;
generate a thermal model of a wall of an enclosure based at least in part on the input data, the wall being modeled as a plurality of layers and the thermal model including a plurality of nodes having three-dimensional positions, each layer of the plurality of layers being associated with at least one node of the plurality of nodes and each node of the plurality of nodes being thermally coupled to an adjacent node by a thermal resistance;
map the three-dimensional positions of the plurality of nodes to two-dimensional positions;
assign a weighting parameter to at least one node of the plurality of nodes, the weighting parameter determining a proximity of the at least one node of the plurality of nodes to a different node of the plurality of nodes;
solve an energy balance equation corresponding to the two-dimensional positions of the plurality of nodes to determine a predicted temperature for at least one node, the two dimensional positions of at least two nodes of the plurality of nodes being determined based on the proximity of the at least one node of the plurality of nodes to the different node of the plurality of nodes; and
output the predicted temperature.

* * * * *